(12) United States Patent
Johnson et al.

(10) Patent No.: US 8,891,338 B2
(45) Date of Patent: Nov. 18, 2014

(54) MEASURING THE ACCURACY OF AN ENDPOINT CLOCK FROM A REMOTE DEVICE

(75) Inventors: Matthew Johnson, Spokane, WA (US); Mark Cornwall, Spokane, WA (US)

(73) Assignee: Itron, Inc., Liberty Lake, WA (US)

( * ) Notice: Subject to any disclaimer, the term of this patent is extended or adjusted under 35 U.S.C. 154(b) by 1100 days.

(21) Appl. No.: 12/362,330

(22) Filed: Jan. 29, 2009

(65) Prior Publication Data

US 2010/0188938 A1    Jul. 29, 2010

(51) Int. Cl.
*H04J 3/06* (2006.01)
*G04C 11/04* (2006.01)
*G01D 4/00* (2006.01)

(52) U.S. Cl.
CPC .............. *G04C 11/04* (2013.01); *Y02B 90/242* (2013.01); *Y04S 20/322* (2013.01); *G01D 4/004* (2013.01)
USPC ............................................ 368/47; 370/509

(58) Field of Classification Search
USPC ....................................... 368/46–47; 370/509
See application file for complete search history.

(56) References Cited

U.S. PATENT DOCUMENTS

| 4,132,981 A | 1/1979 | White |
| 4,190,800 A | 2/1980 | Kelly, Jr. et al. |
| 4,204,195 A | 5/1980 | Bogacki |
| 4,254,472 A | 3/1981 | Juengel et al. |
| 4,322,842 A | 3/1982 | Martinez |
| 4,396,915 A | 8/1983 | Farnsworth et al. |
| 4,425,628 A | 1/1984 | Bedard et al. |
| 4,638,314 A | 1/1987 | Keller |
| 4,749,992 A | 6/1988 | Fitzemeyer et al. |
| 5,138,615 A | 8/1992 | Lamport et al. |
| 5,216,623 A | 6/1993 | Barrett et al. |
| 5,400,246 A | 3/1995 | Wilson et al. |
| 5,432,507 A | 7/1995 | Mussino et al. |
| 5,459,727 A | 10/1995 | Vannucci |
| 5,515,509 A | 5/1996 | Rom |
| 5,608,780 A | 3/1997 | Gerszberg et al. |

(Continued)

FOREIGN PATENT DOCUMENTS

| JP | 10-070774 | 3/1998 |
| JP | 10/135965 | 5/1998 |
| WO | WO 00/54237 | 9/2000 |
| WO | WO 01/55865 | 8/2001 |
| WO | WO 2008/027457 | 3/2008 |

OTHER PUBLICATIONS

Machine translation of abstract of JP 10070774.

(Continued)

*Primary Examiner* — Sean Kayes
(74) *Attorney, Agent, or Firm* — Hanley, Flight & Zimmerman, LLC

(57) ABSTRACT

Packet formats and associated metering infrastructure for filtering meter reading data that is being transmitted by utility meters are disclosed. In one embodiment, a method is provided of measuring the accuracy of an endpoint clock, such as a utility meter clock, from a remote device configured to capture transmissions that originate from the utility meter. Generally, the method includes synchronizing the time maintained by the utility meter with the time maintained by the remote device. The method receives and decodes a packet that includes a time stamp provided by the utility meter. Then, the method calculates the extent of the inaccuracy of the time stamp in the received packet and determines whether the extent of the inaccuracy satisfies a predetermined threshold.

10 Claims, 6 Drawing Sheets

(56) References Cited

U.S. PATENT DOCUMENTS

| | | |
|---|---|---|
| 5,717,718 A | 2/1998 | Rowsell et al. |
| 5,719,564 A | 2/1998 | Sears |
| 5,727,057 A | 3/1998 | Emery et al. |
| 5,767,790 A | 6/1998 | Jovellana |
| 5,844,893 A | 12/1998 | Gollnick et al. |
| 5,874,903 A | 2/1999 | Shuey et al. |
| 5,880,677 A | 3/1999 | Lestician |
| 5,892,758 A | 4/1999 | Argyroudis |
| 5,894,422 A | 4/1999 | Chasek |
| 5,896,097 A | 4/1999 | Cardozo |
| 5,898,387 A | 4/1999 | Davis et al. |
| 5,898,826 A | 4/1999 | Pierce et al. |
| 5,914,673 A | 6/1999 | Jennings et al. |
| 5,933,092 A | 8/1999 | Ouellette et al. |
| 5,963,146 A | 10/1999 | Johnson et al. |
| 5,963,457 A | 10/1999 | Kanoi et al. |
| 5,963,650 A | 10/1999 | Simionescu et al. |
| 5,987,011 A | 11/1999 | Toh |
| 5,991,806 A | 11/1999 | McHann, Jr. |
| 6,014,089 A | 1/2000 | Tracy et al. |
| 6,044,062 A | 3/2000 | Brownrigg et al. |
| 6,058,355 A | 5/2000 | Ahmed et al. |
| 6,073,169 A | 6/2000 | Shuey et al. |
| 6,075,777 A | 6/2000 | Agrawal et al. |
| 6,078,785 A | 6/2000 | Bush |
| 6,088,659 A | 7/2000 | Kelley et al. |
| 6,097,703 A | 8/2000 | Larsen et al. |
| 6,108,699 A | 8/2000 | Moiin |
| 6,124,806 A | 9/2000 | Cunningham et al. |
| 6,134,587 A | 10/2000 | Okanoue |
| 6,137,423 A | 10/2000 | Glorioso et al. |
| 6,150,955 A | 11/2000 | Tracy et al. |
| 6,195,018 B1 | 2/2001 | Ragle et al. |
| 6,239,722 B1 | 5/2001 | Colten et al. |
| 6,240,080 B1 | 5/2001 | Okanoue et al. |
| 6,246,677 B1 | 6/2001 | Nap et al. |
| 6,246,689 B1 | 6/2001 | Shavitt |
| 6,249,516 B1 | 6/2001 | Brownrigg et al. |
| 6,300,881 B1 | 10/2001 | Yee et al. |
| 6,304,556 B1 | 10/2001 | Haas |
| 6,338,087 B1 | 1/2002 | Okanoue |
| 6,366,217 B1 | 4/2002 | Cunningham et al. |
| 6,400,949 B1 | 6/2002 | Bielefeld et al. |
| 6,407,991 B1 | 6/2002 | Meier |
| 6,415,330 B1 | 7/2002 | Okanoue |
| 6,437,692 B1 | 8/2002 | Petite et al. |
| 6,480,505 B1 | 11/2002 | Johansson et al. |
| 6,535,498 B1 | 3/2003 | Larsson et al. |
| 6,538,577 B1 | 3/2003 | Ehrke et al. |
| 6,553,355 B1 | 4/2003 | Arnoux et al. |
| 6,577,671 B1 | 6/2003 | Vimpari |
| 6,606,708 B1 | 8/2003 | Shifrin et al. |
| 6,636,894 B1 | 10/2003 | Short et al. |
| 6,653,945 B2 | 11/2003 | Johnson et al. |
| 6,657,552 B2 | 12/2003 | Belski et al. |
| 6,665,620 B1 | 12/2003 | Burns et al. |
| 6,681,110 B1 | 1/2004 | Crookham et al. |
| 6,691,173 B2 | 2/2004 | Morris et al. |
| 6,697,331 B1 | 2/2004 | Riihinen et al. |
| 6,710,721 B1 | 3/2004 | Holowick |
| 6,711,166 B1 | 3/2004 | Amir et al. |
| 6,711,409 B1 | 3/2004 | Zavgren, Jr. et al. |
| 6,714,787 B2 | 3/2004 | Reed et al. |
| 6,718,137 B1 | 4/2004 | Chin |
| 6,725,281 B1 | 4/2004 | Zintel et al. |
| 6,728,514 B2 | 4/2004 | Bandeira et al. |
| 6,751,455 B1 | 6/2004 | Acampora |
| 6,751,672 B1 | 6/2004 | Khalil et al. |
| 6,775,258 B1 | 8/2004 | van Valkenburg et al. |
| 6,778,099 B1 | 8/2004 | Mayer et al. |
| 6,826,123 B1 * | 11/2004 | Herring ............... 368/46 |
| 6,826,620 B1 | 11/2004 | Mawhinney et al. |
| 6,829,216 B1 | 12/2004 | Nakata |
| 6,829,347 B1 | 12/2004 | Odiaka |
| 6,831,921 B2 | 12/2004 | Higgins |
| 6,845,091 B2 | 1/2005 | Ogier et al. |
| 6,859,742 B2 * | 2/2005 | Randall et al. ............... 702/61 |
| 6,865,185 B1 | 3/2005 | Patel et al. |
| 6,885,309 B1 | 4/2005 | Van Heteren |
| 6,891,838 B1 | 5/2005 | Petite et al. |
| 6,900,738 B2 | 5/2005 | Crichlow |
| 6,904,025 B1 | 6/2005 | Madour et al. |
| 6,904,385 B1 | 6/2005 | Budike, Jr. |
| 6,909,705 B1 | 6/2005 | Lee et al. |
| 6,963,285 B2 | 11/2005 | Fischer et al. |
| 6,975,613 B1 | 12/2005 | Johansson |
| 6,980,973 B1 | 12/2005 | Karpenko |
| 6,985,087 B2 | 1/2006 | Soliman |
| 7,009,379 B2 | 3/2006 | Ramirez |
| 7,009,493 B2 | 3/2006 | Howard et al. |
| 7,016,336 B2 | 3/2006 | Sorensen |
| 7,054,271 B2 | 5/2006 | Brownrigg et al. |
| 7,062,361 B1 | 6/2006 | Lane |
| 7,064,679 B2 | 6/2006 | Ehrke et al. |
| 7,072,945 B1 | 7/2006 | Nieminen et al. |
| 7,102,533 B1 | 9/2006 | Kim |
| 7,103,511 B2 | 9/2006 | Petite |
| 7,106,044 B1 | 9/2006 | Lee, Jr. et al. |
| 7,126,494 B2 | 10/2006 | Ardalan et al. |
| 7,135,956 B2 | 11/2006 | Bartone et al. |
| 7,143,204 B1 | 11/2006 | Kao et al. |
| 7,145,474 B2 | 12/2006 | Shuey et al. |
| 7,170,425 B2 | 1/2007 | Christopher et al. |
| 7,185,131 B2 | 2/2007 | Leach |
| 7,209,840 B2 | 4/2007 | Petite et al. |
| 7,215,926 B2 | 5/2007 | Corbett et al. |
| 7,230,544 B2 | 6/2007 | Van Heteren |
| 7,250,874 B2 | 7/2007 | Mueller et al. |
| 7,271,735 B2 | 9/2007 | Rogai |
| 7,274,305 B1 | 9/2007 | Luttrell |
| 7,274,975 B2 | 9/2007 | Miller |
| 7,277,027 B2 | 10/2007 | Ehrke et al. |
| 7,289,887 B2 | 10/2007 | Rodgers |
| 7,301,476 B2 | 11/2007 | Shuey et al. |
| 7,304,587 B2 | 12/2007 | Boaz |
| 7,308,370 B2 | 12/2007 | Mason, Jr. et al. |
| 7,312,721 B2 | 12/2007 | Mason, Jr. et al. |
| 7,317,404 B2 | 1/2008 | Cumeralto et al. |
| 7,321,316 B2 | 1/2008 | Hancock et al. |
| 7,327,998 B2 | 2/2008 | Kumar et al. |
| 7,346,463 B2 | 3/2008 | Petite et al. |
| 7,349,766 B2 | 3/2008 | Rodgers |
| 7,379,981 B2 | 5/2008 | Elliott et al. |
| 2001/0005368 A1 | 6/2001 | Rune |
| 2001/0038342 A1 | 11/2001 | Foote |
| 2001/0046879 A1 | 11/2001 | Schramm et al. |
| 2002/0012358 A1 | 1/2002 | Sato |
| 2002/0110118 A1 | 8/2002 | Foley |
| 2003/0037268 A1 | 2/2003 | Kistler |
| 2003/0117899 A1 * | 6/2003 | Eidson ............... 368/46 |
| 2003/0123481 A1 | 7/2003 | Neale et al. |
| 2003/0185104 A1 * | 10/2003 | Goergen ............... 368/47 |
| 2004/0034773 A1 | 2/2004 | Balabine et al. |
| 2004/0113810 A1 | 6/2004 | Mason, Jr. et al. |
| 2004/0125776 A1 | 7/2004 | Haugli et al. |
| 2004/0138787 A1 | 7/2004 | Ransom et al. |
| 2004/0140908 A1 | 7/2004 | Gladwin et al. |
| 2004/0157613 A1 | 8/2004 | Steer et al. |
| 2004/0190378 A1 * | 9/2004 | Farmer ............... 368/47 |
| 2005/0027859 A1 | 2/2005 | Alvisi et al. |
| 2005/0030968 A1 | 2/2005 | Rich et al. |
| 2005/0055432 A1 | 3/2005 | Rodgers |
| 2005/0058144 A1 | 3/2005 | Ayyagari et al. |
| 2005/0065742 A1 | 3/2005 | Rodgers |
| 2005/0172024 A1 | 8/2005 | Cheifot et al. |
| 2005/0251403 A1 | 11/2005 | Shuey |
| 2006/0056363 A1 | 3/2006 | Ratiu et al. |
| 2006/0056368 A1 | 3/2006 | Ratiu et al. |
| 2006/0098576 A1 | 5/2006 | Brownrigg et al. |
| 2006/0167784 A1 | 7/2006 | Hoffberg |
| 2006/0184288 A1 | 8/2006 | Rodgers |
| 2006/0215583 A1 | 9/2006 | Castagnoli |
| 2006/0215673 A1 | 9/2006 | Olvera-Hernandez |
| 2006/0217936 A1 | 9/2006 | Mason et al. |

(56) References Cited

U.S. PATENT DOCUMENTS

| | | |
|---|---|---|
| 2006/0271678 A1 | 11/2006 | Jessup et al. |
| 2007/0019598 A1 | 1/2007 | Prehofer |
| 2007/0057767 A1 | 3/2007 | Sun et al. |
| 2007/0058491 A1* | 3/2007 | Dahlen et al. .................. 368/46 |
| 2007/0063868 A1 | 3/2007 | Borleske |
| 2007/0085700 A1 | 4/2007 | Walters et al. |
| 2007/0087756 A1 | 4/2007 | Hoffberg |
| 2007/0103324 A1 | 5/2007 | Kosuge et al. |
| 2007/0109121 A1 | 5/2007 | Cohen |
| 2007/0136817 A1 | 6/2007 | Nguyen |
| 2007/0139220 A1 | 6/2007 | Mirza et al. |
| 2007/0147268 A1 | 6/2007 | Kelley et al. |
| 2007/0189249 A1 | 8/2007 | Gurevich et al. |
| 2007/0200729 A1 | 8/2007 | Borleske et al. |
| 2007/0205915 A1 | 9/2007 | Shuey et al. |
| 2007/0206521 A1 | 9/2007 | Osaje |
| 2007/0207811 A1 | 9/2007 | Das et al. |
| 2007/0248047 A1 | 10/2007 | Shorty et al. |
| 2007/0258508 A1 | 11/2007 | Werb et al. |
| 2007/0266429 A1 | 11/2007 | Ginter et al. |
| 2007/0271006 A1 | 11/2007 | Golden et al. |
| 2007/0276547 A1 | 11/2007 | Miller |
| 2008/0132185 A1 | 6/2008 | Elliott et al. |
| 2008/0177678 A1 | 7/2008 | DiMartini et al. |
| 2009/0028006 A1* | 1/2009 | Ha et al. ........................ 368/46 |
| 2009/0135677 A1* | 5/2009 | Veillette ......................... 368/47 |

OTHER PUBLICATIONS

Machine translation of abstract of JP 10135965.

International Search Report for PCT Application No. PCT/US00/06312, dated Jul. 31, 2000.
International Search Report and Written Opinion for PCT Application No. PCT/US07/19051, dated Sep. 16, 2008.
International Search Report and Written Opinion for PCT Application No. PCT/US08/13016, dated Jan. 9, 2009.
International Search Report and Written Opinion for PCT Application No. PCT/US08/13030, dated Jan. 9, 2009.
International Search Report and Written Opinion for PCT Application No. PCT/US08/13020, dated Jan. 9, 2009.
International Search Report and Written Opinion for PCT Application No. PCT/US08/13023 dated Jan. 12, 2009.
International Search Report and Written Opinion for PCT Application No. PCT/US08/13019, dated Jan. 12, 2009.
International Search Report and Written Opinion for PCT Application No. PCT/US08/13024, dated Jan. 13, 2009.
International Search Report and Written Opinion for PCT Application No. PCT/US08/13025, dated Jan. 13, 2009.
International Search Report and Written Opinion for PCT Application No. PCT/US08/13021, dated Jan. 15, 2009.
International Search Report and Written Opinion for PCT Application No. PCT/US08/13028, dated Jan. 15, 2009.
International Search Report and Written Opinion for PCT Application No. PCT/US08/13022, dated Jan. 27, 2009.
International Search Report and Written Opinion for PCT Application No. PCT/US08/13018, dated Jan. 30, 2009.
International Search Report and Written Opinion for PCT Application No. PCT/US08/13027, dated Feb. 9, 2009.
International Search Report for PCT Application No. PCT/US01/03056, dated Apr. 26, 2001.

* cited by examiner

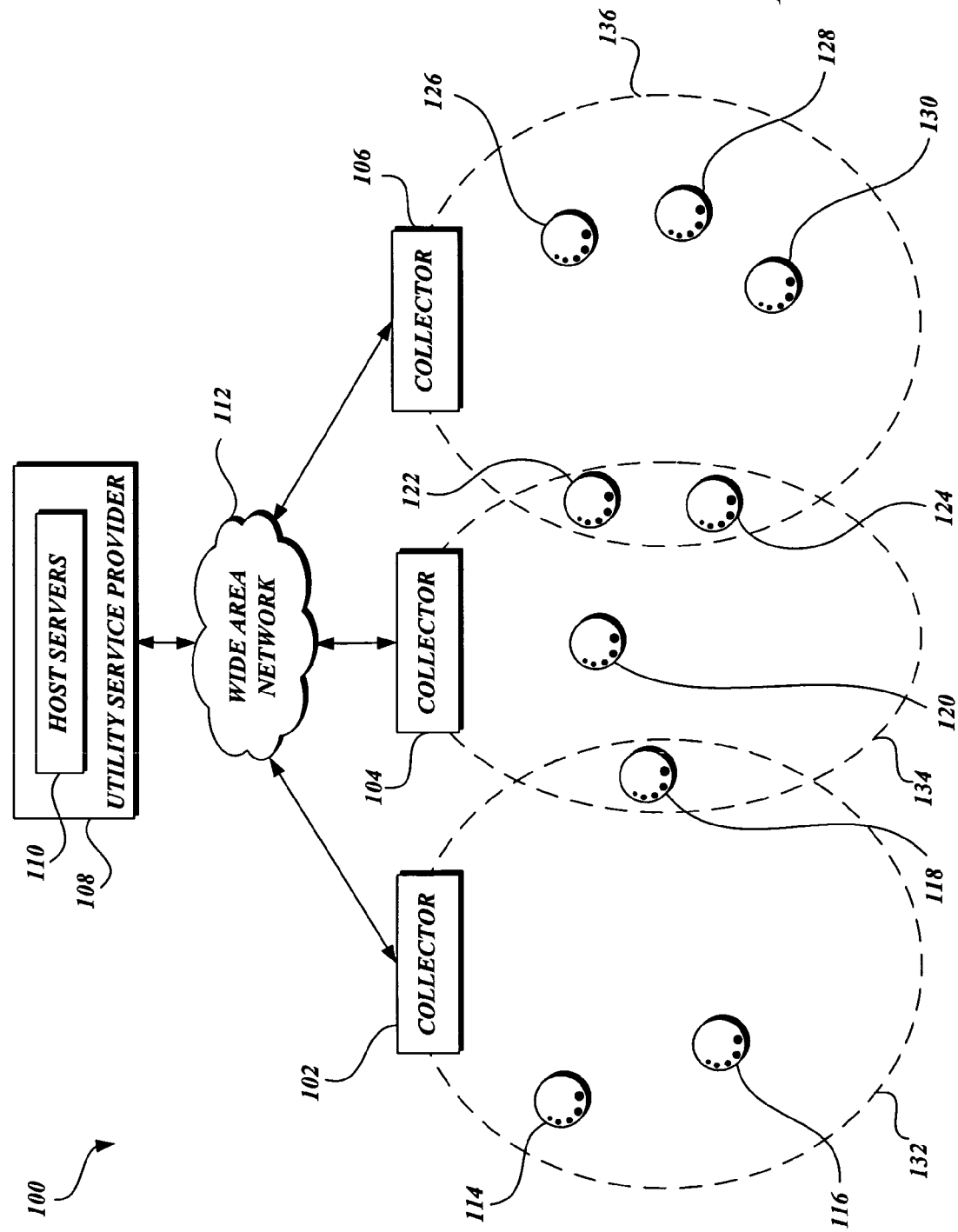

| FIELD # | BYTES | VALUE | DESCRIPTION |
|---|---|---|---|
| 1 | 2 | 16A3 | Frame Sync |
| 2 | 1 | 1F | Protocol ID |
| 3 | 2 | 29EA | Length |
| 4 | 1 | 0F | Message Number |
| 5 | 1 | 1C | Endpoint Type |
| 6 | 4 | xxxxxxxx | Endpoint Serial Number |
| 7 | 1 | 06 | Decode type |
| 8 | 3 | xxxxxx | Multiplier |
| 9 | 4 | xxxxxxxx | Current Consumption |
| 10 | 16 | xx...xx | Hour 1 – 8 Intervals |
| 11 | 1 | xx | Sequence Counter |
| 12 | 2 | xxxx | Time Since Midnight |
| 13 | 1 | xx | Tilt Counter |
| 14 | 1 | xx | Tamper Counter |
| 15 | 2 | xxxx | Network Configuration Bytes |
| 16 | 4 | xxxxxxxx | Packet CRC (32 bit) |

*Fig.2A.*

| FIELD # | BYTES | VALUE | DESCRIPTION |
|---|---|---|---|
| 1 | 2 | 16A3 | Frame Sync |
| 2 | 1 | 1F | Protocol ID |
| 3 | 2 | 147B | Length |
| 4 | 1 | 16 | Message Number |
| 5 | 1 | 1C | Endpoint Type |
| 6 | 4 | xxxxxxx | Endpoint Serial Number |
| 7 | 4 | xxxxxxx | Current Consumption |
| 8 | 2 | xxxx | Time Since Midnight |
| 9 | 1 | xx | Tilt Counter |
| 10 | 1 | xx | Tamper Counter |
| 11 | 2 | xxxx | Network Configuration Bytes |
| 12 | 4 | xxxxxx | Packet CRC (32 bit) |

*Fig.2B.*

MEASURING THE ACCURACY OF AN ENDPOINT CLOCK FROM A REMOTE DEVICE

BACKGROUND

Utility meters may be configured to perform wireless transmission of meter readings. For example, an Encoder Receiver Transmitter ("ERT") may be implemented within a utility meter in order to encode and transmit data utilizing radio-based communications. Utility meters configured to report meter readings in this way are commercially available and increasingly being installed in homes, businesses, and the like. At installation or subsequently, a utility service provider may register and begin obtaining meter readings using a collection system such as fixed network, mobile collection unit, etc.

Transmissions of meter readings are typically encoded as "packetized" data. In the present application, the term "packet" is intended to encompass packets, frames, cells or any other method used to encapsulate data for transmission between remote devices. As understood in the art, packets typically maintain a plurality of fields as well as a preamble and trailer to identify the beginning and end of the packet. For example, existing packet formats typically include a time stamp field identifying the time maintained by the "clock" of a utility meter. To extend the operating life of a battery or other power source, techniques and devices that minimize power consumption are utilized. As a result, a low-power clock having at least some tendency to "drift" from an actual time may be employed by utility meters. Unfortunately, existing packet formats and related systems are not readily able to measure inaccuracies in the time maintained by utility meters.

A collection system employed by a utility service provider may include Cell Control Units ("CCU") that receive meter readings within a geographic coverage area. To provide fault-tolerance and ensure that meter readings are collected, CCUs will typically maintain overlapping coverage areas. As a result, meter readings originating from a utility meter may be received by multiple CCUs with each being forwarded to a utility service provider. During normal operations, this fault tolerance may result in excessive network resources being consumed since the same data is forwarded by multiple CCUs.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Packet formats and associated metering infrastructure for measuring and/or correcting the time kept by endpoint device clocks, such as utility meter clocks, are disclosed. In one embodiment, a method is provided of measuring the accuracy of an endpoint clock, such as a utility meter clock, from a remote device configured to capture transmissions that originate from the utility meter. Generally, the method includes synchronizing the time maintained by the utility meter with the time maintained by the remote device. The method receives and decodes a packet that includes a time stamp provided by the utility meter. Then, the method calculates the extent of the inaccuracy of the time stamp in the received packet and determines whether the extent of the inaccuracy satisfies a predetermined threshold.

DESCRIPTION OF THE DRAWINGS

The foregoing aspects and many of the attendant advantages of this invention will become more readily appreciated by reference to the following detailed description, when taken in conjunction with the accompanying drawings, wherein:

FIG. 1 is a block diagram depicting an illustrative metering environment suitable for collecting data from utility meters;

FIGS. 2A-2B are block diagrams illustrating packet formats suitable for illustrating aspects of the disclosed subject matter;

DETAILED DESCRIPTION

Figure 3:
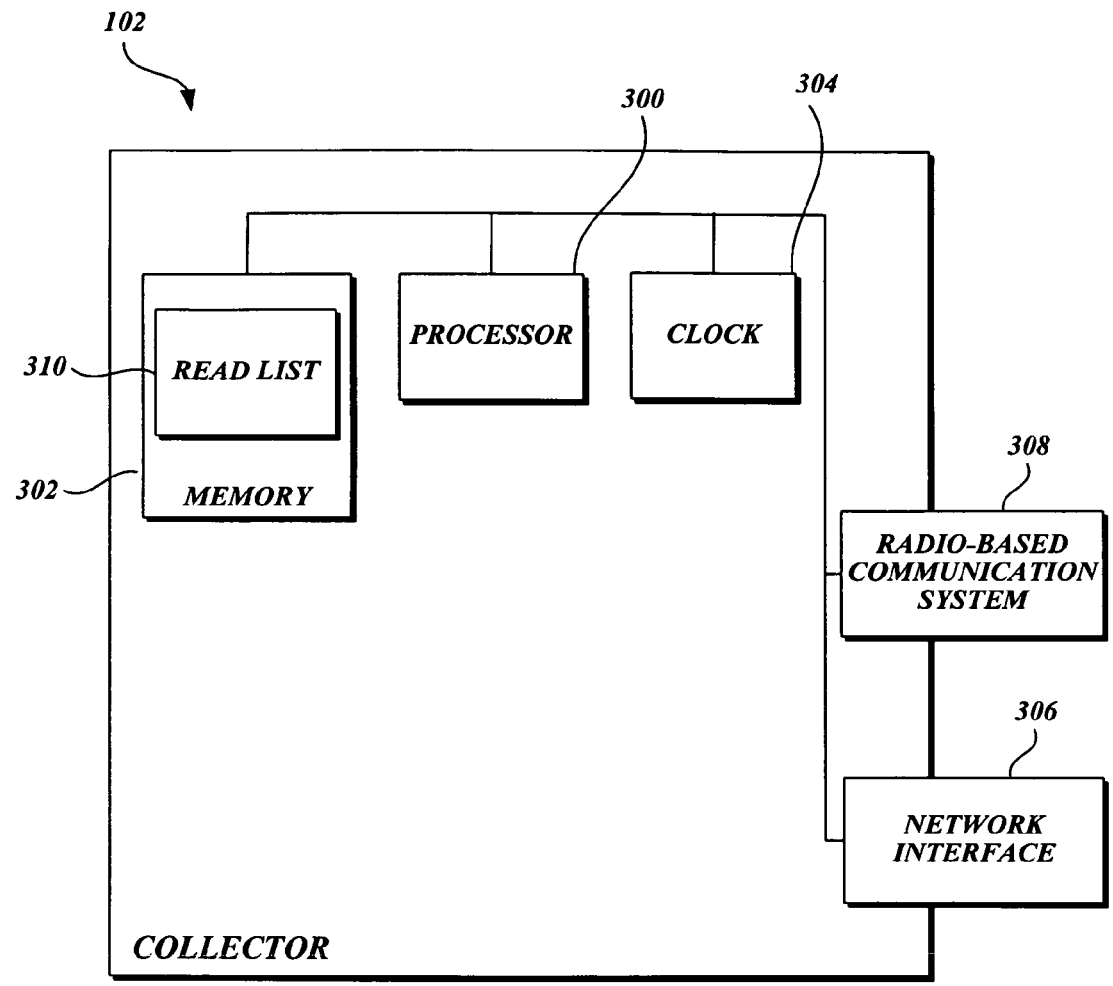
FIG. 3 is a block diagram illustrating components of a collector, such as a Cell Control Unit (CCU)

The detailed description set forth below in connection with the appended drawings is intended as a description of various embodiments of the disclosed subject matter and is not intended to represent the only embodiments. Each embodiment described in this disclosure is provided merely as an example or illustration and should not be construed as preferred or advantageous over other embodiments. In this regard, the following description first provides an overview of a metering environment in which the disclosed subject matter may be implemented. Then, exemplary routines that provide an improved metering infrastructure are described. The illustrative examples provided herein are not intended to be exhaustive or to limit the invention to the precise forms disclosed. Similarly, any steps described herein may be interchangeable with other steps, or combinations of steps, in order to achieve the same or substantially similar result.

Referring to FIG. 1, the following is intended to provide a general overview of a metering environment 100 in which the disclosed subject matter may be implemented. Specifically, the metering environment 100 depicted in FIG. 1 includes a plurality of collectors (e.g., CCUs) 102, 104, and 106 configured to collect data from utility meters. Those skilled in the art and others will recognize that the collectors 102-106 may be one of many types of devices within a fixed network used to collect and forward meter reading data to the utility service provider 108. In this regard, a fixed network may be comprised of additional components not illustrated in FIG. 1 including, but not limited to, antennas, towers, repeaters or any other device used to transmit meter reading data. Moreover, while the collector is described herein as being a device in a fixed network, those skilled in the art and others will recognize that this is merely exemplary as a collector may be a standalone device or a component of a different type of collection system. In the embodiment depicted in FIG. 1, the collectors 102-106 are configured to forward meter reading data to host servers 110 over a wide area network 112, which may be implemented utilizing TCP/IP protocols (e.g., Internet), GPRS or other cellular-based protocols, Ethernet, WiFi, Broadband Over Power Line, and combinations thereof, etc. The host servers 110 maintain application logic for storing and analyzing meter reading data. As described in further detail below, the host servers 110 are configured to analyze a sample of meter readings and rank the collectors 102-106 in their ability to communicate with a particular utility meter.

As illustrated in FIG. 1, the collector 102 is configured to communicate with a plurality of endpoints, such as utility meters 114, 116, and 118, that are located within an associated coverage area 132. Similarly, the collectors 104 and 106 are configured to communicate with the utility meters 118-130 within their associated coverage areas 134 and 136, respectively. As known to those skilled in the art, the utility meters 114-130 may be gas meters, water meters, electric meters, or any other device configured with an endpoint device for transmitting and/or receiving wired or wireless meter reading data. In this regard, each of the utility meters 114-130 is configured to perform communications with collectors utilizing automated meter reading protocols. In this regard, the utility meters 114-130 transmit data either periodically ("bubble-up"), in response to a wake-up signal, or in a combination/hybrid configuration.

Generally described, the collectors 102-106 serve as the interface for collecting meter reading data from devices that utilize automated meter reading protocols (e.g., the utility meters 114-130). However, wireless communications are typically less reliable than communications performed over wired networks. As such, interference sources may exist that prevent meter reading data encoded as one or more packets from being successfully transmitted to a collector. To improve reliability, the utility meters 114-130 are typically configured to transmit the same meter reading data in multiple transmissions. Moreover, the coverage areas of the collectors 102-106 may overlap so that meter readings originating from the utility meters 118, 122, and 124 within overlapping coverage areas are received by multiple collectors. As a result, existing systems may cause an excessive amount of meter reading data to be forwarded to the utility service provider 108.

A packet format and associated metering infrastructure are provided for filtering meter reading data that is received by the collectors 102-106. Generally, a sample of unfiltered meter reading data is obtained and used to rank the ability of different collectors to communicate with the same utility meter. Collectors identified as being less reliable in collecting data for a particular utility meter may be re-configured to "drop" packets received from the utility meter. To facilitate the filtering, network configuration bytes within the packets transmitted by utility meters may be modified in a way that allows the collectors 102-106 to differentiate between packets that will be forwarded to a utility service provider from those that will be "dropped."

In another aspect, a packet format and associated metering infrastructure are provided for identifying and determining whether the "drift" in the time maintained by a utility meter 114-130 is more than a threshold level. As mentioned previously, a low-power clock having at least some tendency to drift from an actual time may be employed to maintain the time within a utility meter 114-130. A substantial amount of drift could ultimately impact the accuracy in the meter reading data that is collected. In one embodiment, a packet format and related systems are provided for monitoring the accuracy of the time maintained by a utility meter 114-130.

The discussion provided above with reference to FIG. 1 is intended as a brief, general description of one metering environment 100 suitable for implementing various aspects of the disclosed subject matter. While the description above is made with reference to specific types of devices linked together through different interfaces, those skilled in the art will appreciate that the disclosed subject matter may be implemented in other contexts. In this regard, different types of devices and communication interfaces than those illustrated in FIG. 1 may be utilized.

For illustrative purposes and by way of example only, representative packets 200 and 250 suitable to illustrate aspects of the disclosed subject matter are depicted in FIGS. 2A-2B. In this regard, the packet 200 illustrated in FIG. 2A includes a plurality of rows ("fields") having entries organized within the BYTES 202, VALUE 204, and DESCRIPTION 206 columns. In this embodiment, the BYTES 202 column includes entries containing integers that identify the amount of data allocated to a particular field. The VALUE 204 column includes entries that identify a fixed or variable value for the data within the field of the packet. Similarly, the DESCRIPTION 206 column includes a string of characters that provides a human-readable description of the field. In accordance with one embodiment, the packet 200 includes fields that allow consumption data for particular intervals of time to be encapsulated and transmitted to a utility service provider. Accordingly, the packet 200 depicted in FIG. 2A is a packet format well-suited for utility meters capable of measuring the consumption of a utility service for specified time intervals.

Similar to FIG. 2A, the packet 250 depicted in FIG. 2B includes a plurality of fields having associated entries organized in the BYTES 252, VALUE 254, and DESCRIPTION 256 columns. The BYTES 252 column includes entries containing integers that identify the amount of data allocated to a particular field. Similar to FIG. 2A, the VALUE 254 and the DESCRIPTION 256 columns include entries identifying a value for the data in the field and human-readable description of a field, respectively. Those skilled in the art and others will recognize that packet size should be minimized when performing network communications. In accordance with one embodiment, the packet 250 depicted in FIG. 2B does not include fields for reporting intervals of consumption data. Accordingly, the packet 250 depicted in FIG. 2B is well-suited for utility meters that are not configured to report consumption data for specified time intervals.

As illustrated in FIGS. 2A-2B, the packets 200 and 250 include the network configuration bytes fields 208 and 258, respectively. As mentioned previously, meter reading data may be filtered to reduce the expenditure of network resources. In one embodiment, the network configuration bytes fields 208 and 258 are configurable and may be set to facilitate the filtering of meter reading data. Specifically, the value in the configuration bytes fields 208 and 258 may be set to a value that allows collectors to determine whether to "drop" a received packet or forward data from the packet to a utility service provider. In addition, the packets 200 and 250 include the time since midnight fields 210 and 260, respectively. As described in further detail below, the time since midnight fields 210 and 260 may be utilized to determine the accuracy of the time maintained by a utility meter. While the fields 210 and 260 report time since a particular fixed point, this should be construed as exemplary.

Those skilled in the art and others will recognize that attributes and format of the packets 200 and 250 illustrated in FIGS. 2A-2B are only illustrative. In this regard, entries within the fields of the packets 200 and 250 may be added/removed or otherwise modified in alternative embodiments. Accordingly, the packets 200 and 250 are only representative embodiments of how meter reading data may be encapsulated for transmission from a utility meter.

Now with reference to FIG. 3, an exemplary component architecture for a collector 102 also depicted in FIG. 1 will be described. Specifically, the collector 102 includes a processor 300, a memory 302, and a clock 304. In addition, the collector 102 includes a network interface 306 comprising components for communicating with other devices over the wide area network 112 (FIG. 1). As further depicted in FIG. 3, the collector 102 includes a radio-based communication system 308 for transmitting/receiving wireless communications with other radio-based devices (e.g., the utility meters 114-118). For ease of illustration, FIG. 3 does not depict other components such as transmitter and receiver circuitry, analog to digital converter, amplifier, power source, etc., which will typically be included with the radio-based communication system 308. However, since these and other components that may be included with the collector 102 are not relevant to the claimed subject matter they will not be described in detail here.

The memory 302 depicted in FIG. 3 is one example of computer-readable media suitable for storing data that is used to implement aspects of the disclosed subject matter. As used herein, the term "computer-readable media" includes volatile and non-volatile and removable and non-removable memory implemented in any method or technology capable of storing information, such as computer-readable instructions, data structures, program modules, or other data. In this regard, the memory 302 depicted in FIG. 3 is one example of a computer-readable media but other types of computer-readable media may be used.

In one embodiment, the processor 300 is configured to receive meter reading data (e.g., packets) from one or more utility meters utilizing the radio-based communication system 308. The received data is parsed and re-packaged into a structured format suitable for transmission over the wide area network 112 to the host servers 110. In this regard, data from a plurality of collectors may be aggregated in a data store maintained by the utility service provider 108. The aggregated data is analyzed to quantify and rank the ability of different collectors to communicate with a particular utility meter. Based on the ranking, a read list 310 is created and stored in the memory 302 that may be used to filter data received from different utility meters. In this regard, logic suitable to be executed by the processor 300 performs processing to determine whether received packets originate from a utility meter identified on the read list 310. When a packet originates from a utility meter on the read list 310, the meter reading data is parsed, re-packaged, and forwarded to the utility service provider 108. In contrast, packets that originate from utility meters that are not on the read list 310 may be dropped without being forwarded to the utility service provider 108. In an alternative embodiment, a "black" list (not illustrated) is created and stored in the memory 302. As such, packets that originate from utility meters on the black list may be dropped in this alternative embodiment.

Figure 4:
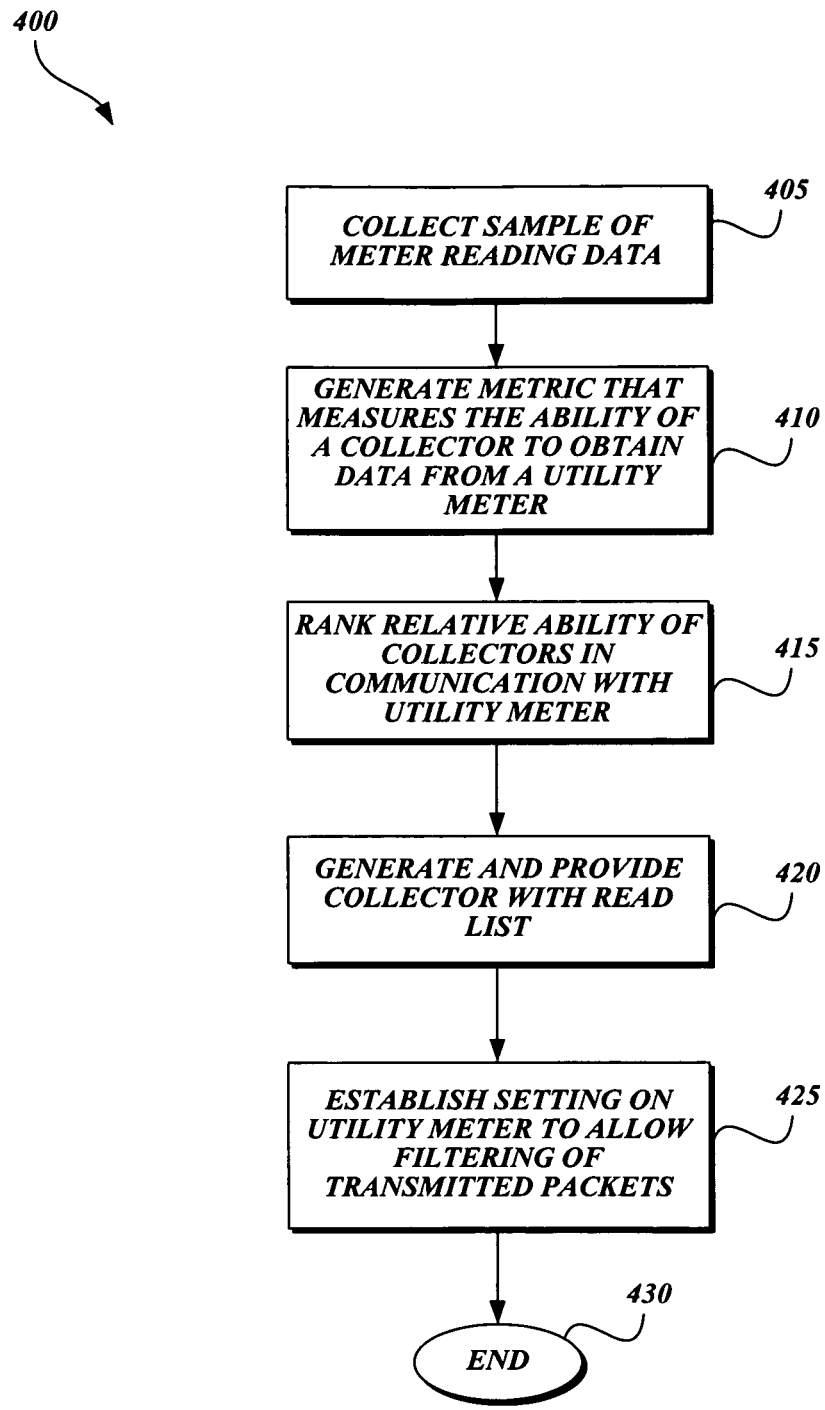
FIG. 4 is a flow diagram of one exemplary routine for filtering meter reading data.

Now, with reference to FIG. 4, one representative embodiment of a filtering routine 400, suitable for being implemented in the metering environment 100 depicted in FIG. 1, is provided. As depicted in FIG. 4, the filtering routine 400 begins at block 405 where a sample of meter reading data is collected. In this regard, collectors with potentially overlapping coverage areas may be used to collect the sample. By way of another example, a mobile control unit (e.g., utility vehicle) configured with a radio transceiver may be used to collect a sample of meter reading data, at block 405. Moreover, those skilled in the art and others will recognize that meter reading data may be collected utilizing other systems (e.g., mesh/micro networks, handheld devices, Telephone-Base, etc.) and the examples provided herein should be construed as exemplary.

At block 410 of the filtering routine 400, a metric is generated that measures the ability of a collector to collect data from a particular utility meter. As mentioned previously, the utility service provider 108 maintains the host servers 110 with associated application logic for managing and aggregating the collection of data in a metering environment. To facilitate billings and monitor the performance of the metering infrastructure, the host servers 110 are configured to process meter reading data in a variety of ways. At block 410, a metric known as a "read coefficient" may be generated that quantifies the number of meter readings successfully obtained by a collector from a particular utility meter. As mentioned above, utility meters may be configured to transmit meter reading data at known intervals. Since the total number of meter readings transmitted over the sample time period is known, the read coefficient may be readily generated by comparing the packets successfully obtained by a collector with the total number of packets transmitted from a utility meter. However, those skilled in the art and others will recognize that the ability of the collectors 102-106 to communicate with a utility meter may be measured utilizing other factors such as, but not limited to, signal strength, interference measurements, and combinations thereof, etc. Accordingly, the exemplary utilization of a read coefficient should be construed as exemplary as the ability of a collector to obtain meter reading data may be measured, at block 410, in other ways without departing from the scope of the claimed subject matter.

At block 415 of the filtering routine 400, a ranking that assesses the relative ability of two or more collectors to communicate with the same utility meter is generated. In this regard, the metric quantified at block 410 may be used to rank the ability of collectors to communicate with the same utility meter. Accordingly, collectors that received higher read coefficients, as a result of successfully collecting a higher percentage of meter readings during the sample period, will be ranked higher than collectors associated with lower read coefficients.

At block 420 of the filtering routine 400, a read list is generated identifying utility meters from which meter reading data will be forwarded by a collector. As mentioned previously, a read list 310 allows a collector 102 to differentiate between meter reading data that will be forwarded to a utility service provider 108 from meter reading data that will be "dropped." The creation of the read list 310 may be based on rankings that assess the relative ability of a plurality of collectors to communicate with the same utility meter (generated at block 415). In one embodiment, a predetermined number of collectors (e.g., 3) that are ranked the highest in their ability to communicate with a utility meter will be configured to forward meter reading data received from a utility meter. In this regard, the number of collectors that are allowed to forward meter reading data is configurable and may depend on network and device variables that make a particular configuration preferable over another. In this way, aspects of the disclosed subject matter are able to provide a fault-tolerant metering infrastructure while still allowing the expenditure of network resources to be minimized.

At block 425 of the filtering routine 400, settings of a utility meter are established to allow filtering of transmitted packets. The disclosed subject matter may be implemented in the context of a metering infrastructure in which a utility meter may be re-configured based on a received command. In one aspect, existing metering protocols are extended so that a collector may generate a command to modify the value of the network configuration bytes field 210 or 260 of packets being transmitted from a utility meter. For example, a collector identified as being the highest ranked in communicating with a utility meter may generate and transmit a command to establish the value of the network configuration bytes field 208 or 258 that will be transmitted from a utility meter. Then, the filtering routine 400 proceeds to block 430, where it terminates. Once the filtering routine 400 has been performed, the utility meters 114-130 will be configured to encode and transmit packets in a way that allows the collectors 102-106 to filter received meter reading data. Collectors identified as being the most reliable in communicating with a particular utility meter will forward data originating from the utility meter to a service provider. In contrast, lower-ranked collectors will not forward data originating from the utility meter, thereby conserving network resources.

It should be well understood that the filtering routine 400 described above with reference to FIG. 4 does not show all of the functions performed within the metering environment 100 depicted in FIG. 1. Instead, the filtering routine 400 describes the commands and data exchanges performed in order to filter data originating from utility meters. Those skilled in the art and others will recognize that some functions and/or exchanges of data described above may be performed in a different order, omitted/added, or otherwise varied without departing from the scope of the claimed subject matter. For example, the filtering routine 400 provided above with reference to FIG. 4 describes the embodiment where a "read" list is created to filter meter readings. However, in alternative embodiments, a "black" list may be created and used to filter meter readings without departing from the scope of the claimed subject matter.

Figure 5:
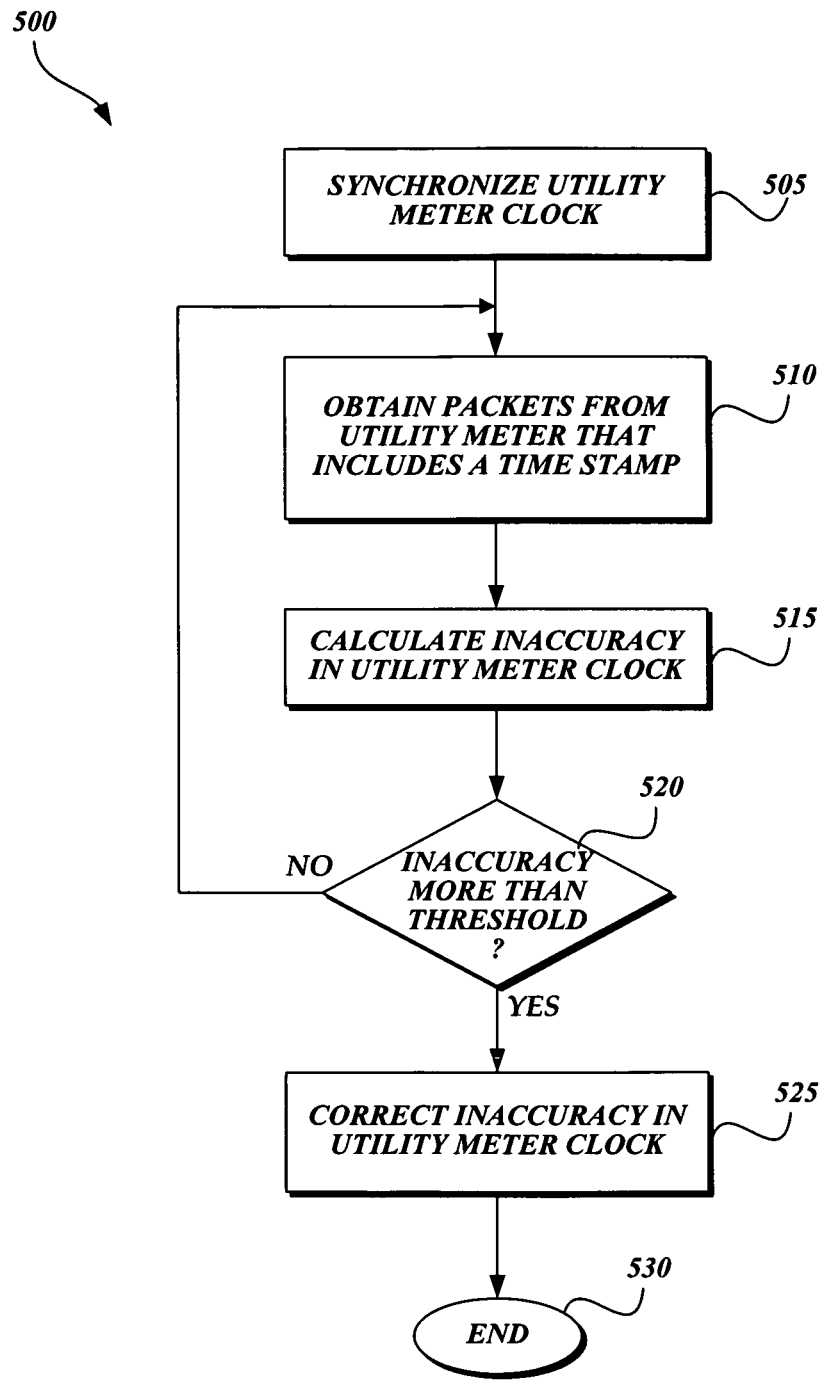
FIG. 5 is a flow diagram of one exemplary routine for performing an analysis of the time maintained by a utility meter.

Now with reference to FIG. 5, one representative embodiment of a timing routine 500 will be described that determines whether the time maintained by a utility meter is within tolerable error limits. As depicted in FIG. 5, the timing routine 500 begins at block 505 where a low-power clock maintained by a utility meter is synchronized with a more accurate clock. As mentioned above, the time maintained by a utility meter may be less reliable and have at least some tendency to drift from the actual time. In contrast, a collector (e.g., CCU) does not have the same power restrictions as utility meters and may be configured with a more accurate clock 304. In one embodiment, existing systems allow the clock 304 of the collector 102 to be synchronized with a very accurate time utilizing Global Positioning Systems ("GPS"). Alternatively or as a backup, the clock 304 of the collector 102 may be synchronized to devices coupled to the wide area network 112 utilizing the Network Time Protocol ("NTP"). However, those skilled in the art will recognize that the time maintained by the clock 304 may be synchronized in other ways without departing from the scope of the claimed subject matter. In addition, the time maintained by the collector 102 may be synchronized with a utility meter, at block 505. However, to conserve power and minimize the consumption of network resources, synchronization of the clock in a utility meter with a known accurate time of a collector may be performed as needed based on a predetermined amount of projected "drift" in the utility meter clock, on a periodic basis, and the like.

At block 510 of the timing routine 500, one or more packets originating from a utility meter are collected. As mentioned previously, an existing metering infrastructure may be used to collect packets originating from a utility meter that contains a time stamp. For example, the packets 200 and 250 (FIGS. 2A-B) maintain the time since midnight fields 210 or 260 that provide a time stamp since the most recent synchronization with a known accurate time. Accordingly, in obtaining meter reading data, collectors also obtain a time stamp from which the accuracy of a utility meter clock may be measured. Those skilled in the art will recognize that the time since midnight is merely one exemplary time in which data may be recorded. In alternative embodiments, the time stamp included in the packet is from a different reference point, maintains a shorter/longer time interval, etc.

As further illustrated in FIG. 5, the inaccuracy in the time maintained by a utility meter is calculated, at block 515. Specifically, the value in the time since midnight fields 210 or 260 of one or more received packets may be compared to the time maintained by a collector. In this regard, calculating the inaccuracy of a utility meter clock may include identifying a percentage difference between the more accurate time maintained by a collector and the time stamp value represented in a received packet. Moreover, the calculations performed at block 515 may also include aggregating and normalizing a plurality of time stamps from multiple packets. In this regard, those skilled in the art and others will recognize that the inaccuracy of a utility meter clock may be calculated in other ways without departing from the scope of the claimed subject matter.

At decision block 520, a determination is made regarding whether the inaccuracy in a utility meter clock is greater than a predetermined error threshold. In this regard, an error threshold may be established so that inaccuracies rising to a certain percentage (e.g., 5%) from any given interval will satisfy the threshold. In addition, error thresholds may be based on systematic inaccuracies observed over multiple intervals. In any event, if an inaccuracy in a utility meter clock does not satisfy the error threshold, then the result of the test performed at block 520 is "no" and the timing routine 500 proceeds back to block 510. Conversely, if an error threshold is satisfied, the result of the test performed at block 520 is "yes" and the timing routine 500 proceeds to block 525. Then, at block 525, action is performed to correct the inaccuracy in a utility meter clock. In this regard, the corrective action taken at block 525 may include having utility service personnel replace a component of a utility meter. In addition or alternatively, the corrective action may include resetting a utility meter clock and/or propagating a software update that compensates for the inaccuracy. Then, once the corrective action to the utility meter clock has been implemented, the timing routine 500 proceeds to block 530 where it terminates.

While embodiments of the claimed subject matter have been illustrated and described, it will be appreciated that various changes can be made therein without departing from the spirit and scope of the present disclosure.

The embodiments of the invention in which an exclusive property or privilege is claimed are defined as follows:

1. A method performed by a utility data collector in a network, the method comprising:
    receiving a read list identifying utility meters from which utility data is to be received and forwarded to a utility service provider;
    transmitting, to the utility meters identified in the read list, a command to modify a network configuration field to a first value, the network configuration field to be included in utility data packets transmitted by the utility meters;
    receiving utility data from a first utility meter identified by the read list, the utility data including utility data packet, the utility data packet having a time stamp, a network configuration field, and a utility consumption field;
    determining an inaccuracy of a clock of the utility meter based on the time stamp; and
    forwarding the utility data packet to the utility service provider only if the network configuration field of the utility data packet includes the first value.

2. The method as recited in claim 1, wherein determining the inaccuracy of the clock of the first utility meter based on the time stamp comprises:
   decoding the utility data packet to determine a clock value of the first utility meter based on the time stamp;
   determining a clock value difference between the clock value of the first utility meter and a clock value of the collector; and
   comparing the clock value difference with a predetermined threshold to determine the inaccuracy of the clock of the first utility meter.

3. The method as recited in claim 2, further comprising taking corrective action when the inaccuracy of the clock satisfies the predetermined threshold.

4. The method as recited in claim 3, wherein taking corrective action comprises at least one of replacing a component of the first utility meter, resetting the clock of the first utility meter, and installing a software update to the first utility meter that compensates for the inaccuracy.

5. The method as recited in claim 2, further comprises:
   comparing the determined inaccuracy of the clock of the first utility meter to a previously determined clock inaccuracy; and
   determining a percentage of inaccuracy between the determined inaccuracy of the clock of the first utility meter and the previously determined clock inaccuracy.

6. The method as recited in claim 2, wherein comparing the clock value difference with a predetermined threshold to determine the inaccuracy of the clock of the first utility meter comprises normalizing inaccuracies among a plurality of utility data packets.

7. The method as recited in claim 1, wherein transmitting the utility data packet to the utility service provider comprises parsing and re-packaging the utility data packet before transmitting the utility data packet to the utility service provider.

8. The method as recited in claim 1, wherein the time stamp further indicates an elapsed time since a most recent synchronization between the first utility meter and the collector.

9. The method as recited in claim 1, wherein the collector is located remotely from the first utility meter.

10. The method as recited in claim 1, further comprising transmitting information from the collector to a remote device in the network.

* * * * *